3,428,769
INDUCTION HEATING TOOL
Joseph F. Ciszewski, Surfside, Masashi Hayase, Fountain Valley, and Norman F. Robinson, Manhattan Beach, Calif., assignors, by mesne assignments, to McDonnell Douglas Corporation, Santa Monica, Calif., a corporation of Maryland
Filed July 26, 1966, Ser. No. 567,944
U.S. Cl. 219—9.5                              7 Claims
Int. Cl. B23k 13/02

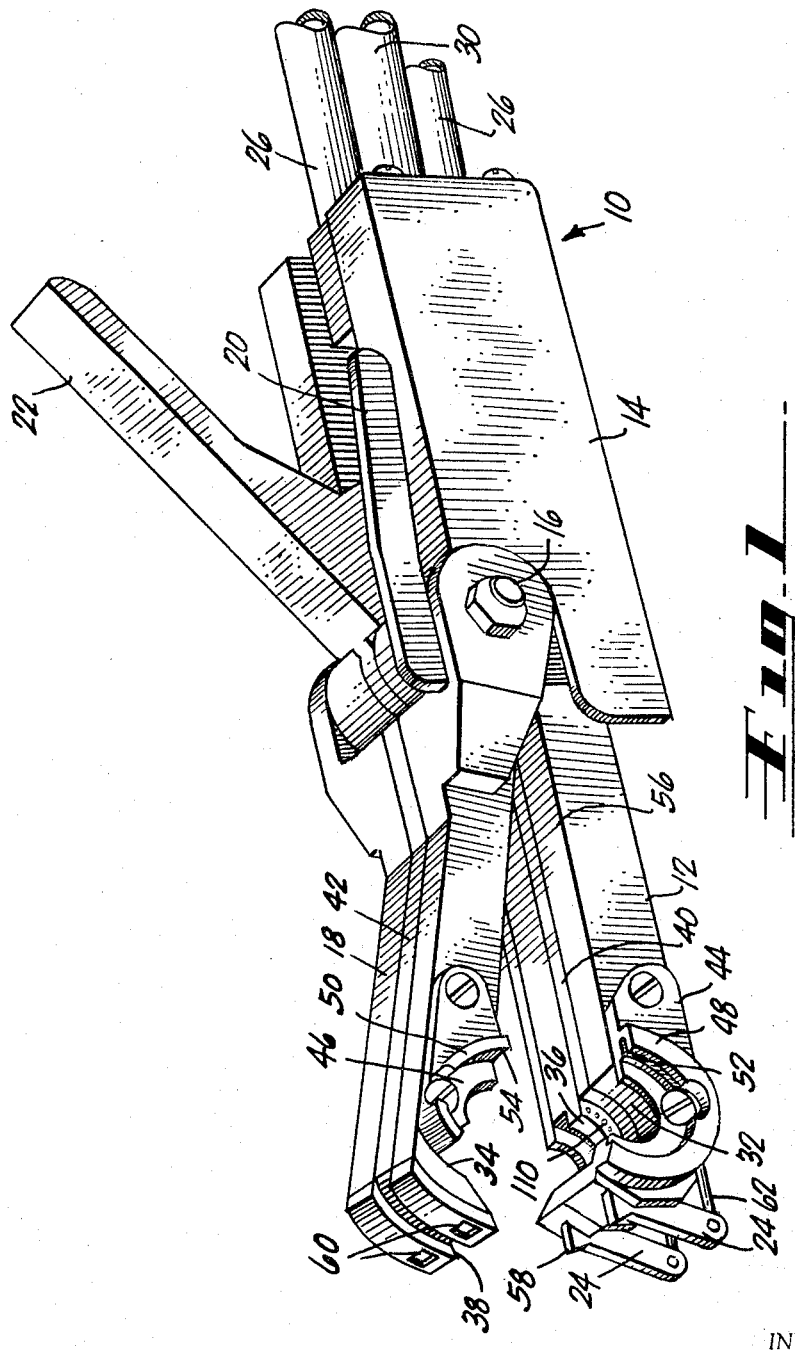

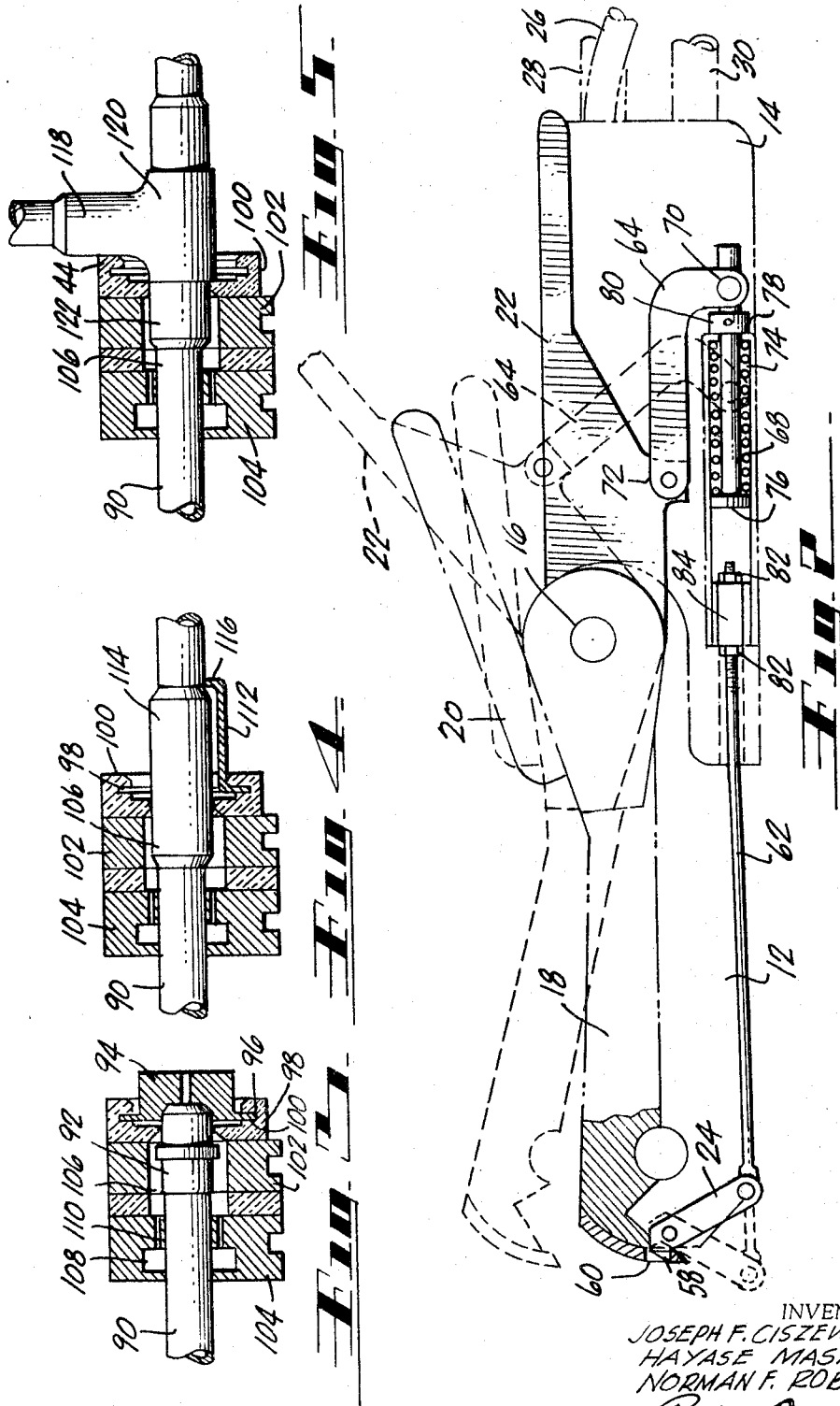

ABSTRACT OF THE DISCLOSURE

An induction heating tool for welding or brazing tubes and their associated couplings and connectors wherein a split single turn inductor forms a heating chamber when the jaws are closed and locked.

Background of the invention

Perhaps the easiest and most inexpensive way of connecting tubes, couplings and connectors is with threaded connections. However, this requires sufficient wall strength, and care must be taken to insure that the joints do not leak under environmental conditions to which they are intended to be subjected. The welding, brazing or soldering of joints and inner connections between the tubes and their associated couplings have obvious advantages over the use of threaded connections, particularly when the joint must be made fluid tight and be permanent in nature. One such method is that of brazing with an induction heating of the joint until a filler metal melts and forms a bond with the base metal and thus integrally connect the tubes with their associated connections. Induction heating is done by passing an alternating electric current through a coil. The workpiece is placed within the coil and the eddy currents induced in the workpiece by the changing magnetic field causes the workpiece to become heated. The brazing is performed in an inert atmosphere to prevent oxidation and contamination to thus reduce the effectiveness of the braze. To prevent the coil from overheating, a water or other cooling fluid may be passed to transfer heat therefrom without interference with the heat generation of the part to be brazed.

Summary of the invention

In accordance with the present invention, there is provided an induction heating tool in which an induction coil is closely coupled around the workpiece so that heating is concentrated in the area of the joint to be brazed. A multi-purpose clamp and chill block holds the tube and fittings firmly and accurately within the induction coil for uniform heating, conducts heat away from the tube to prevent or limit the annealing of heat-treated or work-hardened tubes so that the heat-affected zone is limited mainly to that portion of the tube inserted into and reinforced by the fitting. A gaseous source is provided for a one-way flow to purge the induction heating area of air. The gas may be inert or chemically active, as desired. Located spacers are provided to precisely locate the brazing fitting within the tool and to utilize the narrow heat zone generated by the tool.

The features described are combined in a compact, easily operated, quick opening pliers-type tool which is water cooled by means of inner connecting passages through the major coil and chill components. Upon opening the tool to load or unload the workpiece, no water passages are opened and the water system remains sealed at all times. A locking device is used to provide a sufficient and predictable clamping force between the jaws of the tool to insure good electrical contact and satisfactory tool clamping action.

It is one object of this invention to provide for an efficient and compact induction heating tool.

Another object is the provision of a tool for heating a workpiece in an appropriate atmosphere, with means for limiting the heat conduction upon the workpiece and means for cooling the heating means as desired.

Other objects will become more apparent as a description of the invention proceeds, having reference to the drawings, wherein:

FIG. 1 is a perspective view of the tool;

FIG. 2 is a longitudinal view partially in section to show the jaw latching arrangement; and FIGS. 3, 4 and 5 are sectional views illustrating three types of fittings and associated attachments used in their connection to associated tubing.

Description of illustrative embodiments

Reference is no made to FIG. 1 wherein there is shown a pliers-type tool 10 consisting of an integrally connected jaw 12 and handle 14. Pivotally connected at a first pivot point by means of bolt 16 is another jaw 18 which may be opened or closed in confined spaces by lever 20. Handle or locking actuator 22 controls the movement of latches 24 which lock jaw 18 into closed position during the heating operation. Electrical RF power and cooling water enter and leave the tool through conductors 26, 28 and shielding gas is fed to the tool through conductor 30. Jaws 12 and 18 have a narrow single turn strip induction coil section 32, 34 forming a heating chamber closely coupled to the workpiece so that heating is concentrated in the area of the joint. A cooling portion or chill section 26, 38 is electrically isolated by spacers 40, 42 from the induction coil section 32, 34 and serves to position a fitting for welding, conduct heat from the coupling to prevent or limit the annealing of heat-treated or work-hardened connectors and to serve as a source of gas for purging the induction heating area. These features will be more fully explained hereinafter with reference to FIGS. 3, 4 and 5.

Jaws 12 and 18 have complimentary spacer sections 44, 46. These spacers consist of insulating material attached to the tool on the induction coil side. These spacers have rims 48, 50 inwardly of which are grooves 52, 54 for the insertion of flanged fittings as will be described in connection with FIGS. 3 and 4.

It should be noted that spacers 44, 46 are not evenly split segments and that spacer 44 has a rim and groove that encircles more than one-half the circumference formed by the two spacers when jaws 12 and 18 are fastened together. This permits flanged fittings, shown in FIGS. 3 and 4, to snap into position within the groove 52 and be frictionally retained thereby before the tool is placed over the workpiece and jaw 18 closed.

Jaw 18 is locked in position parallel with, and in abutting contact with, jaw 12. A shim of insulating material 56 prevents electrical contact between jaws 18 and 12 except where the outer edges of coil 32, 34 meet when the jaws are locked. Thus, radio frequency energy passes along the inner surface of jaw 12 beneath the shim 56, around coil 32, 34 and back along the under surface of jaw 18. Jaw 18 is held in position in proximity to jaw 12 during the heating operation by means of latches 24 pivotally mounted on the end of jaw 12 and having retaining cams 58 engageable with openings 60 in the end of jaw 18. Having the latches at the end of the jaws maintain them in a snug fit to avoid arcing and to prevent any deformation of the soft metal jaws. Latches 24 are inner connected through actuating rods 62 to the locking actuator 22. When jaw 18 is in position, a downward depression of the locking actuator 22 causes the cammed surfaces 58 to engage the edge of opening 60. This is more clearly shown in FIG. 2.

FIG. 2 shows a longitudinal view partially in section to illustrate the latching arrangement. Here there is shown in phantom lines the handle 14, lower jaw 12, upper jaw 18, lever 20. Inner connecting latch 24 with locking actuator 22, actuating rod 62 and lever 64 are shown in one position with solid lines and in the other position with dashed lines.

Actuating rod 62 terminates in barrel sleeve 66 within which moves plunger 68. Plunger 68 is pivotally connected at a third pivot point to end 70 of lever 64. The other end 72 of lever 64 is pivotally connected at a second pivot point to the locking actuator 22. Spring 74 is positioned around plunger 68 between plunger end 76 and end 78 of sleeve 66. Spring 74 urges plunger 68 inwardly in an amount limited by stop member 80. Adjusting nuts 82 on the end of actuating rod 62 on either side of end 84 permit the actuating rod 62 to be set at the required length.

When jaw 18 is in the open position shown in dashed lines in FIG. 2, the locking actuator 22 is shown in the raised or open position, also shown in dashed lines. Lever 64 is then in the raised position shown in dashed lines and actuating rod 62 is moved forwardly so that locking latch 24 is in the position shown in dashed lines. In this position cam 58 of latch 24 is clear of the arc of movement of the end of the jaw 18. End 72 of lever 64 is above the center line between pivot 16 of the actuating arm and the third pivot point at end 70. When jaw 18 is moved downwardly in contact with jaw 12 around the coupling to be heated, the locking actuator 22 is depressed downwardly, moving end 72 of lever 64 below the center line between bolt 16 and end 70 to provide a locking action. End 70 moves rearwardly to the point shown by lever 64 in solid line, causing actuating rod 62 to move rearwardly and cam 58 to engage opening 60 in jaw 18. Spring 74 urges barrel sleeve 66 rearwardly in taut position.

Reference is now made to FIG. 3 which shows in cross section the positioning of a tube 90 and tube nut sleeve 92. A flanged fitting 94 is first positioned with its rim 96 and groove 98 of spacer 100 mounted to the lower jaw 102 forming the lower half of the single turn induction coil. Tube nut sleeve 92 is positioned over tube 90, which in turn rests in position on chill block 104. Fitting 94 limits and positions the sleeve within the heat chamber 106.

Within the chill block 104 is another chamber 108 into which an inert gas is fed from the gas tube 30 shown in FIGS. 1 and 2. A plurality of apertures 110 permit gas to flow in one direction through the heat chamber 106 to purge this chamber of contamination during the heating process. The size of the opening for sleeve 92 permits gas leakage at the other end.

In FIG. 4 there is shown a flanged fitting 112 which will position a union 114 correctly within the brazing chamber 106 for brazing the union 114 to tube 90. This flanged fittting 112 fits within the groove 98 of the spacer 100 in the same manner as the flanged fitting 94 in FIG. 3. However, the outer portion of fitting 112 has a shoulder 116 which abuts the outer end of union 114 to retain it in position.

In FIG. 5 the outer edge of spacer 44 positions branch 118 of T-joint 120 so that branch 122 is correctly positioned within heat chamber 106 in order for it to be properly welded to tube 90. Thus it can be seen that spacer 44 and removable flanged fittings 94, in FIG. 3, and 112, in FIG. 4, may be used to properly position the assorted couplings for welding to a tube.

Having thus described a preferred embodiment of the present invention, it is to be understood that various modifications and variations are to be anticipated and it is understood that these deviations from the embodiment just described are to be considered as part of the present invention as defined by the appended claims.

What is claimed is:
1. An induction heating tool comprising:
a lower jaw;
a second jaw pivotally mounted relative to said lower jaw for movement between open and closed positions;
said jaws forming a split inductor heating chamber within which a workpiece may be positioned for heating;
said jaws forming a cooling portion adjacent said heating chamber to conduct heat from that portion of said workpiece extending therein;
a spacer mounted on said jaws adjacent said heating chamber;
flanged fittings;
said spacer having a groove therein to receive said fittings;
said fittings contacting and positioning said workpiece in said heating chamber.
2. An induction heating tool as in claim 1,
said lower jaw having a first portion of said spacer mounted thereon;
said second jaw having the remaining portion of said spacer mounted thereon;
both said portions having an annular groove forming a circle;
the groove in said first portion of said spacer being longer than half the circumference of said circle formed by said grooves to snugly retain a fitting when said second jaw is in open position.
3. An induction heating tool comprising:
a lower jaw;
a second jaw pivotally mounted relative to said lower jaw movement between open and closed positions;
said jaws forming a split induction heating chamber within which a workpiece may be positioned for heating;
said jaws forming a cooling portion adjacent said heating chamber to conduct heat from that portion of said workpiece extending therein,
said lower jaw having a locking dog pivotally mounted thereon;
an actuating rod connected to said dog and extending therefrom;
a locking actuator pivotally mounted on said lower jaw and operably connected to said actuating rod, said actuator being movable between open and closed positions; and
means on said second jaw engageable with said locking dog to secure said second jaw in locked position.
4. An induction heating tool as in claim 3, and
a lever pivotally connecting said locking actuator with said actuating rod.
5. An induction heating tool as in claim 3,
said means being an opening for receiving said locking dog upon movement therein when said actuator is moved to closed position.
6. An induction heating tool as in claim 3,
a lever pivotally connected to said locking actuator at a second pivot point spaced from a first pivot point connecting said locking actuator with said lower jaw;
said lever being operably connected to said actuating rod at a third pivot point;
said second pivot point passing across a line between said first and third points upon movement of said locking actuator between locked and unlocked positions.
7. An induction heating tool as in claim 3,
a sleeve;
a plunger within said sleeve and extending therefrom;
a spring urging said plunger into said sleeve to shorten the overall length thereof;
said sleeve being connected to said actuating rod, said plunger being operatively connected to said actuator.

(References on following page)

References Cited

UNITED STATES PATENTS

| | | | |
|---|---|---|---|
| 2,297,491 | 9/1942 | Meier | 219—9.5 X |
| 3,110,793 | 11/1963 | Worthington | 219—9.5 |
| 3,268,703 | 8/1966 | Schoppman et al. | 219—9.5 |

RICHARD M. WOOD, *Primary Examiner.*

BARRY A. STEIN, *Assistant Examiner.*

U.S. Cl. X.R.

219—10.79